US012372225B1

(12) United States Patent
Nelson et al.

(10) Patent No.: US 12,372,225 B1
(45) Date of Patent: Jul. 29, 2025

(54) TRIPOD FOR POLE MOUNTED LANTERN

(71) Applicant: Devos, LLC, Springville, UT (US)

(72) Inventors: Chris Nelson, Provo, UT (US); Richard Smith, Spanish Fork, UT (US)

(73) Assignee: Devos, LLC, Springville, UT (US)

( * ) Notice: Subject to any disclaimer, the term of this patent is extended or adjusted under 35 U.S.C. 154(b) by 0 days.

(21) Appl. No.: 18/664,945

(22) Filed: May 15, 2024

(51) Int. Cl.
| | |
|---|---|
| *F21V 21/06* | (2006.01) |
| *F16B 7/18* | (2006.01) |
| *F16M 11/24* | (2006.01) |
| *F16M 11/36* | (2006.01) |
| *F21S 6/00* | (2006.01) |
| *F21V 21/26* | (2006.01) |

(52) U.S. Cl.
CPC ............. *F21V 21/06* (2013.01); *F16B 7/182* (2013.01); *F16M 11/242* (2013.01); *F16M 11/36* (2013.01); *F21S 6/005* (2013.01); *F21V 21/26* (2013.01); *F16M 2200/08* (2013.01)

(58) Field of Classification Search
CPC ....... F16B 7/182; F16M 11/36; F16M 11/242; F16M 2200/08; F21V 21/06; F21V 21/26
USPC .......................................................... 362/382
See application file for complete search history.

(56) References Cited

U.S. PATENT DOCUMENTS

| | | | | |
|---|---|---|---|---|
| 4,121,799 A | * | 10/1978 | Michio ................... | F16M 11/38 248/188.7 |
| 5,746,407 A | * | 5/1998 | Nakatani ................ | F16M 11/18 248/407 |
| 5,769,370 A | * | 6/1998 | Ashjaee .................. | H01Q 1/18 248/168 |
| 2009/0072100 A1 | * | 3/2009 | Zierer .................... | F16M 11/28 248/169 |
| 2010/0237263 A1 | * | 9/2010 | Walesa ................. | F21V 23/0442 362/184 |
| 2012/0298829 A1 | * | 11/2012 | Johnson ................ | F16M 11/36 248/188.4 |
| 2021/0109425 A1 | * | 4/2021 | Jankura .................. | F16M 11/16 |
| 2023/0096179 A1 | * | 3/2023 | Hutton, Jr. .............. | A45B 5/00 135/66 |

FOREIGN PATENT DOCUMENTS

AU          2021106892 A4 *  11/2021   ............... B60R 9/02

OTHER PUBLICATIONS

Camera Aluminum Monopod with Metal Tripod Base, https://www.koolehaoda.net/collections/camera-monopod/products/camera-aluminum-monopod-with-metal-tripod-base, accessed Mar. 7, 2023, 6 pages.
DOCZ foot stabilser, https://www.3leggedthing.com/us/docz2.html, accessed Mar. 7, 2023, 14 pags.

* cited by examiner

*Primary Examiner* — Keith G. Delahoussaye
(74) *Attorney, Agent, or Firm* — Thorpe North & Western, LLP (57) ABSTRACT

A tripod stand is configured to support a pole mounted lantern. A bar is carried by a leg and biased by a spring into engagement with a pair of tracks with a wavy profile to resist displacement of the bar out of a valley of the wavy profile. The leg releasably retains a spike to secure the tripod stand to the ground.

20 Claims, 11 Drawing Sheets

TRIPOD FOR POLE MOUNTED LANTERN

BACKGROUND

Various different flashlights and lanterns have been proposed. It can often be difficult to direct light to an area where light is needed. In addition, it can be difficult to position and secure a light. Providing portable light solutions is an ongoing endeavor.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 2 is an exploded view of the tripod stand of FIG. 1a.

FIG. 3 is a perspective view of a base of the tripod stand of FIG. 1a.

FIG. 4 is a perspective view of a cartridge of the tripod stand of FIG. 1a.

FIG. 6 is a partial side schematic view of an interior of the base of the tripod stand of FIG. 1a.

FIG. 7 is a side view of the cartridge of the tripod stand of FIG. 1a.

FIG. 9 is a top end view of the leg and the cartridge of the tripod stand of FIG. 1a.

FIG. 10 is a bottom end view of the cartridge of the tripod stand of FIG. 1a.

FIG. 11 is a perspective view of a housing of the cartridge of the tripod stand of FIG. 1a.

FIG. 12 is a cross-sectional side view of the housing of the cartridge of the tripod stand of FIG. 1a.

FIG. 13 is a perspective view of the base of the tripod stand of FIG. 1a.

FIG. 14 is a side view of the base of the tripod stand of FIG. 1a.

FIG. 15 is a bottom view of the base of the tripod stand of FIG. 1a.

FIG. 16 is an exploded view of the leg of the tripod stand of FIG. 1a.

FIG. 17 is a detailed partial exploded view of the leg of the tripod stand of FIG. 1a.

FIG. 20 is a bottom end view of the leg of the tripod stand of FIG. 1a.

Reference will now be made to the exemplary embodiments illustrated, and specific language will be used herein to describe the same. It will nevertheless be understood that no limitation of the scope of the invention is thereby intended.

DETAILED DESCRIPTION

Before invention embodiments are disclosed and described, it is to be understood that no limitation to the particular structures, process steps, or materials disclosed herein is intended, but also includes equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

An initial overview of the inventive concepts is provided below and then specific examples are described in further detail later. This initial summary is intended to aid readers in understanding the examples more quickly, but is not intended to identify key features or essential features of the examples, nor is it intended to limit the scope of the claimed subject matter.

The invention provides a tripod stand with legs capable of being positioned and oriented between two or more fixed positions and orientations, including a collapsed orientation and an extended orientation. The tripod stand has connections for holding and maintaining the legs at a desired predetermined orientation and resisting inadvertent movement of the legs. The legs can be selectively moved between the orientations by overcoming the resistance of the connections. The connection can include a cartridge with a bar biased by a spring. The bar can transition along a wavy track with valleys corresponding to the orientations and intervening peaks to resist transition between the valleys and the orientations. The spring can bias the bar into a valley. Pivoting the leg can displace the bar from the valley and along a peak to a proximate valley. In addition, the peaks and the spring can bias the bar, and thus the leg, into a proximate valley and orientation.

The tripod stand can carry and support a pole mounted lantern that can be elevated to provide overhead illumination for a larger area, such as for camping overlanding, RVing, outdoor cooking, backyard sports and other nighttime activities, while reducing glare and drawing away insects from the area. The lantern can be stabilized by the tripod stand.

Referring to FIGS. 1a-15, an example tripod stand 10 is shown. The tripod stand 10 can receive and support a vertical pole 14 with a lantern 18. The pole 14 can be oriented vertically in use, and horizontally or another orientation when collapsed and stored. The pole 14 can be carried by the tripod stand 10. The pole 14 can be telescopic. The lantern 18 can be carried by the pole 14. Supporting the lantern 18 on the pole 14 can allow the lantern to provide 360-degree light coverage.

The tripod stand 10 can have a base 22 with a plurality of legs 26 pivotally coupled to the base 22. The base can form a center of the tripod stand 10 and an apex for the legs 26. The base 22 can have a center bore 30 to receive the vertical pole 14. The center bore 30 can have a selectively variable size or diameter and a segmented wall closable by a fastener to selectively grip the vertical pole 14 at a select position along a length thereof. The base 22 can have a plurality of arms 34 extending radially from the center bore 30 and corresponding to the legs 26. A fastener bore 38 can extend through each arm 34. A fastener 42 (FIG. 2), such as a bolt or pin, can extend through the fastener bore 38 to pivotally couple a leg 26 to the arm 34 of the base 22. The fastener 42 can form a pivot axle 46 about which the leg 26 can pivot. In one aspect, the base 22 can be formed of plastic and can be formed by injection molding.

The legs 26 can be tubular with a hollow 50 and opposite open ends. In addition, the legs can have a proximal end 54 coupled to the base 22. The leg 26 can have a pair of bores 58 aligned with the fastener bore 38 of the base 22 and the pivot axle 46. The fastener 42 and the pivot axle 46 can extend through the bores 58 of the leg 26. In addition, the leg 26 can have a pair of opposite slots 62. In one aspect, the legs 26 can have a cross-sectional profile of an interior perimeter 66 (FIG. 9) of the hollow 50 taken perpendicularly to a longitudinal axis 70 (FIG. 2) of the leg 26. In another aspect, the leg 26 can have opposite sides with one side 74 (FIG. 9) being concave and another side 78 being convex. The profile and interior perimeter 66 of the leg 26 can facilitate grasping and/or can provide strength or rigidity. In another aspect, legs 26 can be formed of metal, such as aluminum, and can be formed by extrusion. The proximal ends 54 of the legs 26 can be pivotal coupled to the base 22 by the fastener 42 and the pivot axle 46.

Figures 1A, 1B:
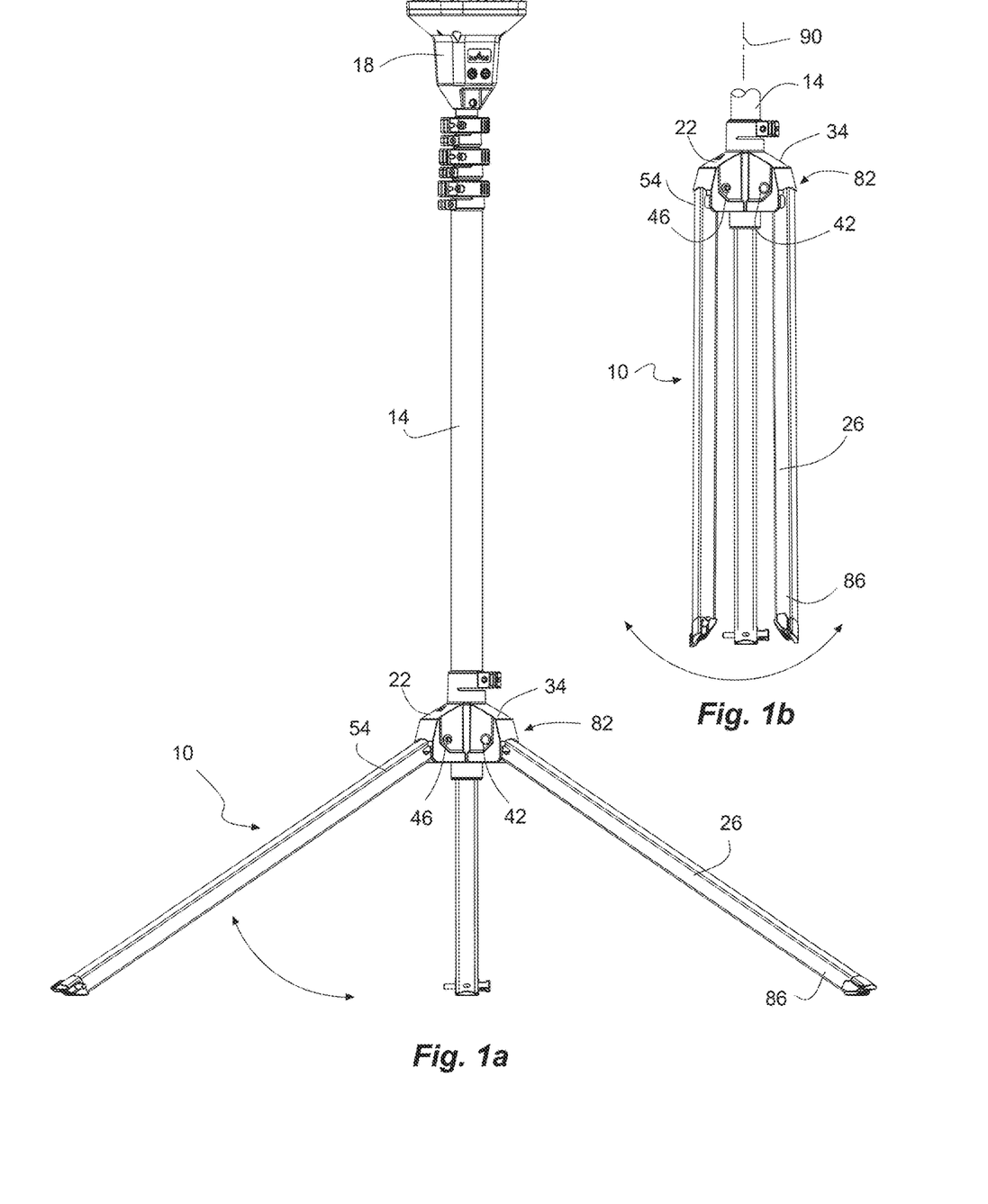
FIG. 1a is a side view of an example of a tripod stand, in accordance with an embodiment, shown with a pole mounted lantern, and shown with legs in an extended orientation.
FIG. 1b is side view of the tripod stand of FIG. 1a, shown with the legs in a collapsed orientation.
Figure 2:
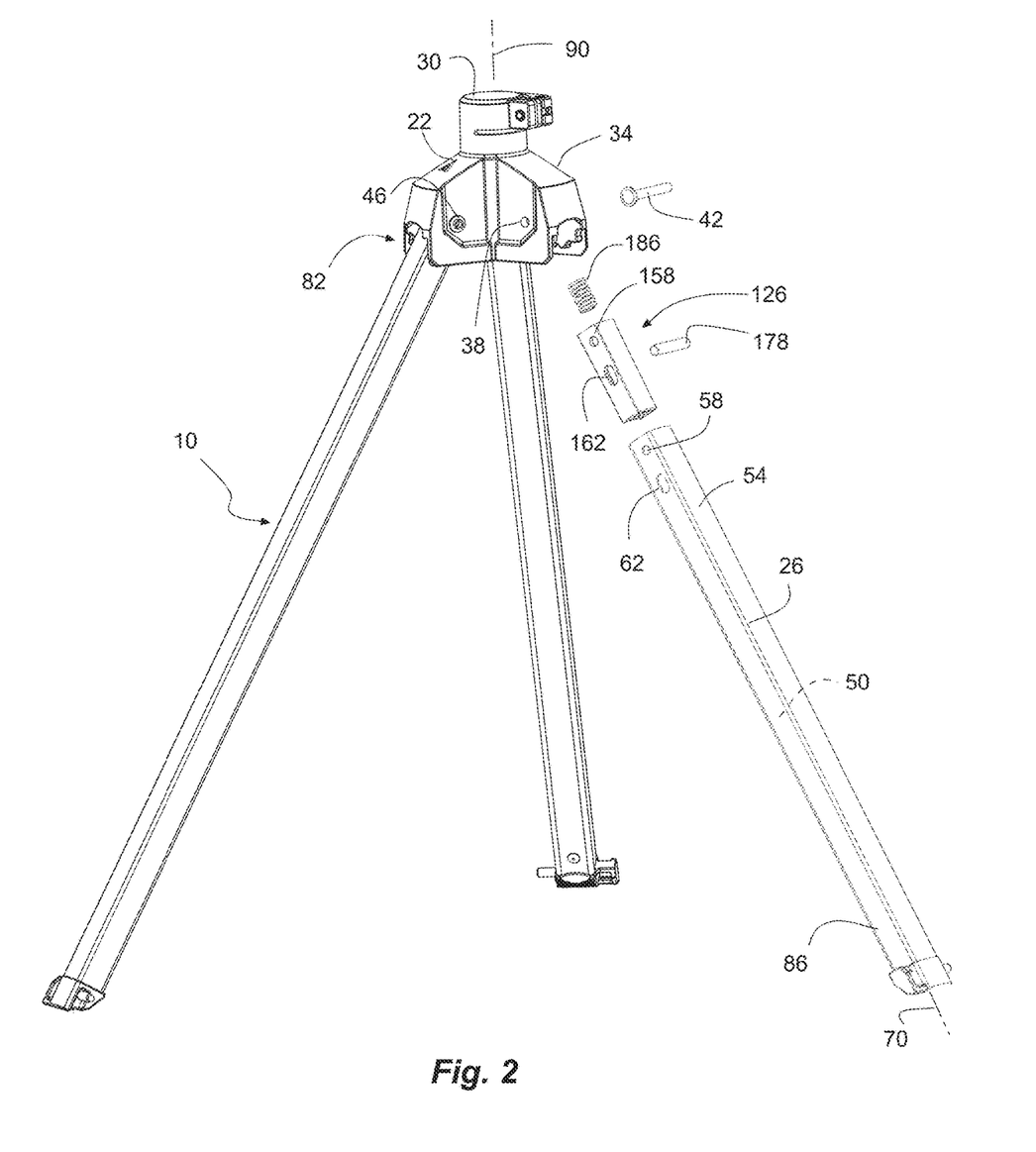
Figure 3:
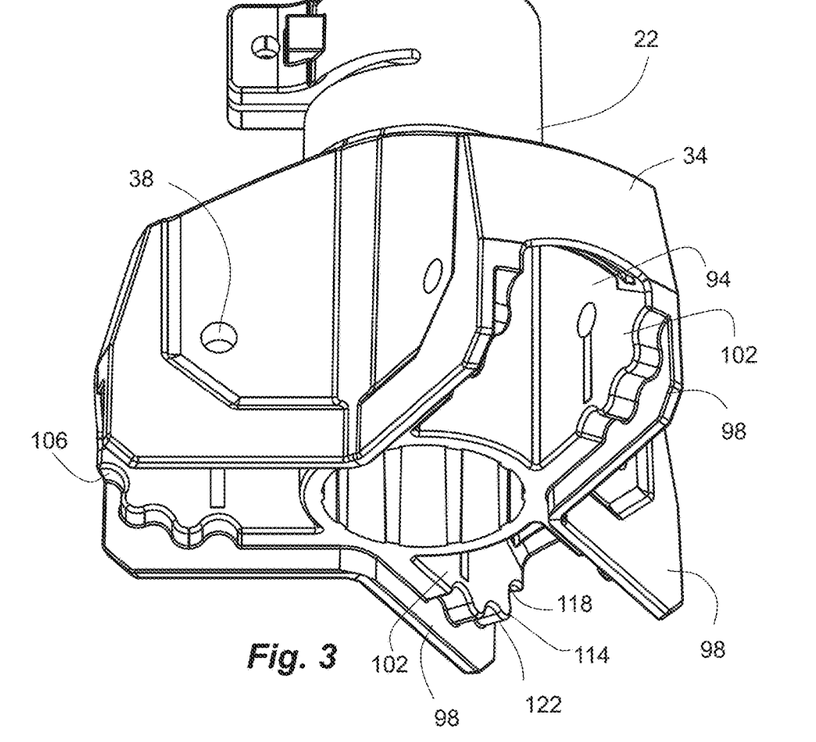
Figure 4:
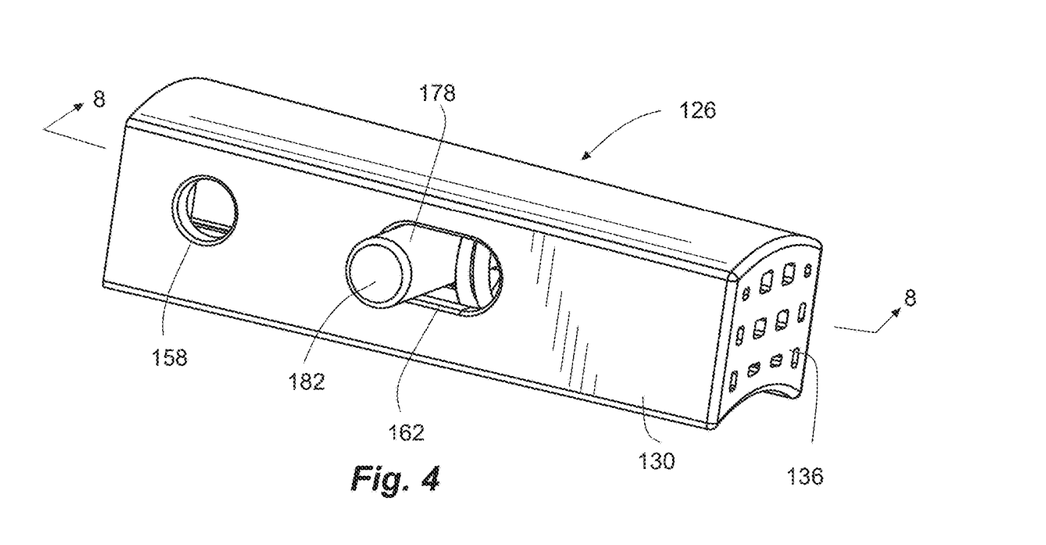
Figure 5A:
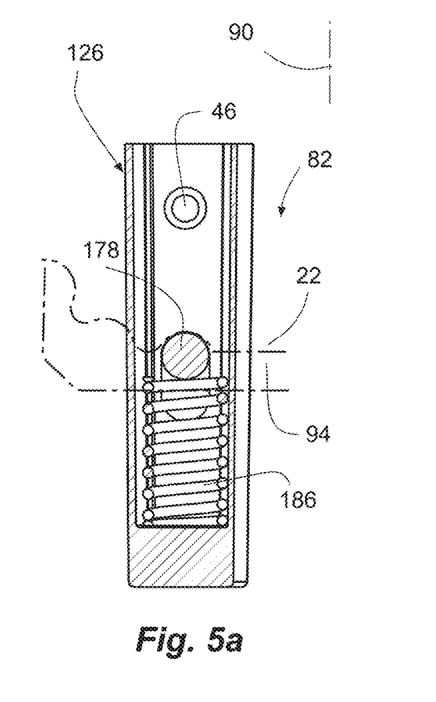
FIG. 5a is a schematic side view of a connection between the base and a leg or the cartridge of the tripod stand of FIG. 1a, shown in a collapsed orientation and with the leg removed.
Figure 5B:
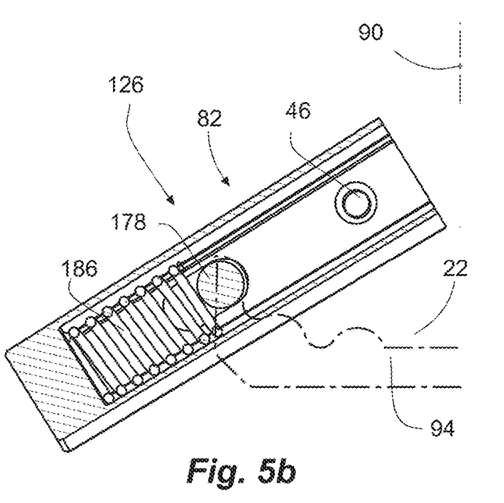
FIG. 5b is a schematic side view of the connection between the base and the leg and the cartridge of the tripod stand of FIG. 1a, shown in an extended orientation and with the leg removed.
Figure 5C:
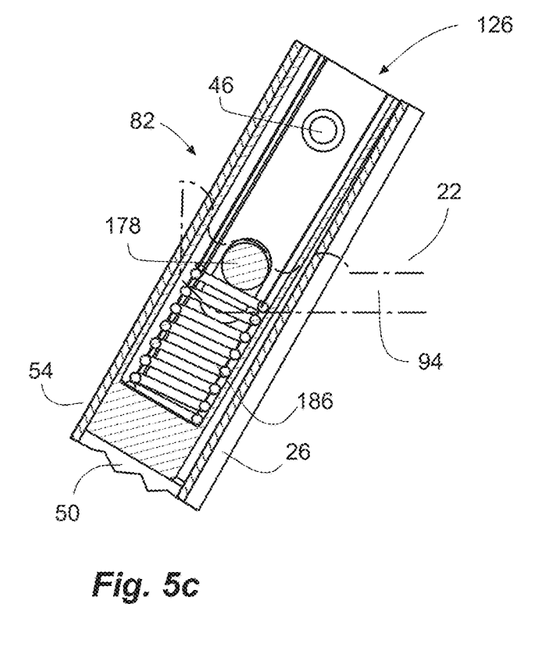
FIG. 5c is a schematic side view of the connection between the base and the leg or the cartridge of the tripod stand of FIG. 1a, shown in an intermediate orientation.

A connection 82 can be formed between the proximal end 54 of each leg 26 and the base 22. A single connection 82 will be described with the understanding that the description applies to each connection 82. The connection 82 can include the pivot axle 46 pivotally coupling the leg 26 to the base 22. The leg 26 can be pivotal about the pivot axle 46 between a plurality of different orientations. The orientations can include a collapsed orientation and an extended orientation. In addition, the orientations can include at least one intermediate orientation. In the collapsed orientation, a distal free end 86 of the leg 26 can be positioned inward with respect to the base 22 and proximate distal free ends 86 of the plurality of legs 26, and with the leg 26 oriented substantially vertically and parallel with a longitudinal axis 90 of the base 22, as shown in FIGS. 1b and 5a. In the extended orientation, the distal free end 86 can be positioned outward with respect to the base 22 and away from the distal distal free ends 86 of the plurality of legs 26, and with the leg 26 oriented transverse with respect to the longitudinal axis 90 of the base 22, as shown in FIGS. 1a and 5b. In the intermediate orientation, the leg 26 can be oriented between the collapsed orientation and the extended orientation, as shown in FIG. 5c.

The connection 82 can also include a channel 94 in the arm 34 of the base 22 to receive the proximal end 54 of the leg 26. The channel 94 can have a pair of opposing side walls 98. A pair of opposing protrusions 102 can extend inward towards one another from the pair of opposing side walls 98. A pair of tracks 106 can be positioned on the pair of opposing protrusions 102. The tracks 106 can face outwardly with respect to the channel 94. Each track 106 can be arcuate with a convex curvature 110 (FIG. 6) about the pivot axle 46. Each track 106 can have a wavy profile 114 with a plurality of valleys 118 and intervening peaks 122. Each valley 118 can be positioned between proximate peaks 122. Each valley 118 of the wavy profile 114 can correspond to an orientation of the leg 26. In one aspect, the valleys 118 and the peaks 122 can have oppositely oriented crescent profiles arranged in series.

A cartridge 126 can be inserted into the hollow 50 at the proximal end 54 of the leg 26. The cartridge 126 can have a housing 130 with a cavity 134 therein. The cartridge 126 and the housing 130 can have a bottom 136 and an open end 138 opposite the bottom 136. The bottom 136 can have a thickness along a longitudinal axis 142 of the cartridge 126 or the housing 130. The thickness of the bottom 136 can be greater than a thickness of a lateral wall 144 of the cartridge 126 perpendicular to the longitudinal axis 142 of the cartridge 126. The greater thickness of the bottom 136 can accommodate a spring force, as discussed herein. The bottom 136 can have a grid 146 with a plurality of ribs 150 extending across the cavity 134 and traversing one another. The grid 146 of ribs 150 can also accommodate the spring force. Openings 154 in the grid 146 between the ribs 150 can allow liquid drainage from the cavity. The cartridge 126 and the housing 130 can have a pair of apertures 158 aligned with the pair of bores 58 of the leg 26. The fastener 42 and the pivot axle 46 can also extend through the apertures 158 of the cartridge 126. In addition, the cartridge 126 and the housing 130 can have a pair of opposite slots 162 aligned with the pair of opposite slots 62 of the leg 26. In one aspect, the cartridge 126 can be formed of plastic, and can be formed by injection molding.

In another aspect, the cartridge 126 can have a cross-sectional exterior perimeter 166 (FIG. 9) taken perpendicularly to the longitudinal axis 142 of the cartridge 126. The cartridge 126 can have opposite sides with one side 170 being concave and another side 174 being convex. The perimeter 166 of the cartridge 126 can match the interior perimeter 66 of the hollow 50 of the leg 26. Thus, the cartridge 126 can have a snug fit in the hollow 50 without significant movement. In one aspect, the cartridge 126 can provide structural support to the proximal end 54 of the leg 26 and the connection 82 between the proximal end 54 of the leg 26 and the channel 94 of the arm 34 of the base 22. The cartridge 126 can resist warping or bending of the proximal end 54 of the leg 26 as force is applied to the leg 26 and the connection 82 to transition the leg 26 between orientations.

A bar 178 can be carried by the cartridge 126 and the proximal end 54 of the leg 26. The bar 178 can be movably positioned in the channel 94 of the base 22 and encapsulated by the side walls 98. In addition, the bar 178 can be oriented perpendicularly to the pair of opposing side walls 98 and parallel with the pivot axle 46. The bar 178 can have opposite ends 182 extending through the pair of opposite slots 162 of the cartridge 126 and the pair of opposite slots 62 of the leg 26 and into engagement with the tracks 106 in the channel 94 of the base 22. The bar 178 can move in the slot 162 of the cartridge 126 and the slot 62 of the leg 26 while the cartridge 126 remains fixed with the leg 26. In one aspect, the bar 178 can be formed of metal from bar stock.

A spring 186 can be carried by the cavity 134 of the cartridge 126 and the proximal end 54 of the leg 26. The spring 186 can extend between the bottom 136 of the cavity 134 of the cartridge 126 and the bar 178. The spring 186 can bias the bar 178 into engagement with the pair of tracks 106. The spring 186 can also bias the bar 178 into a valley 118 of the wavy profile 114 to resist displacement of the bar 178 out of the valley 118 of the wavy profile 114. In one aspect, the spring 186 can be a coil compression spring, as shown.

In another aspect, the spring 186 can have a different configuration than a coil compression spring, such as coil tension spring, a leaf spring, a Belleville spring, etc.

Figure 6:
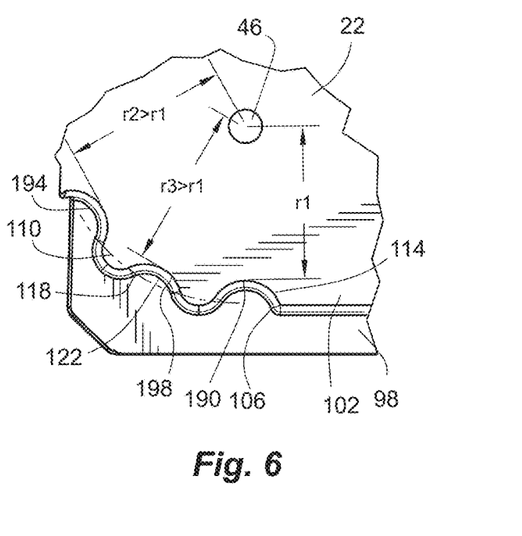
Figure 7:
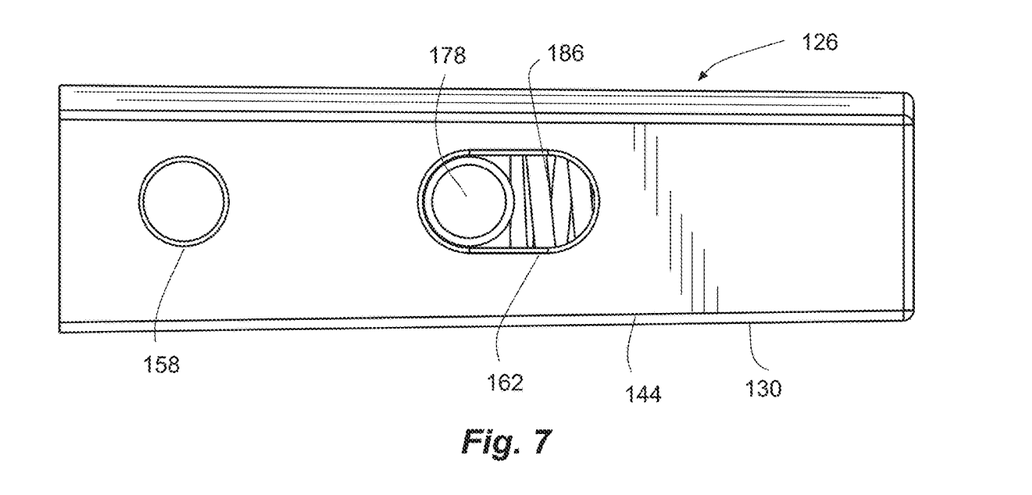
Figure 8:
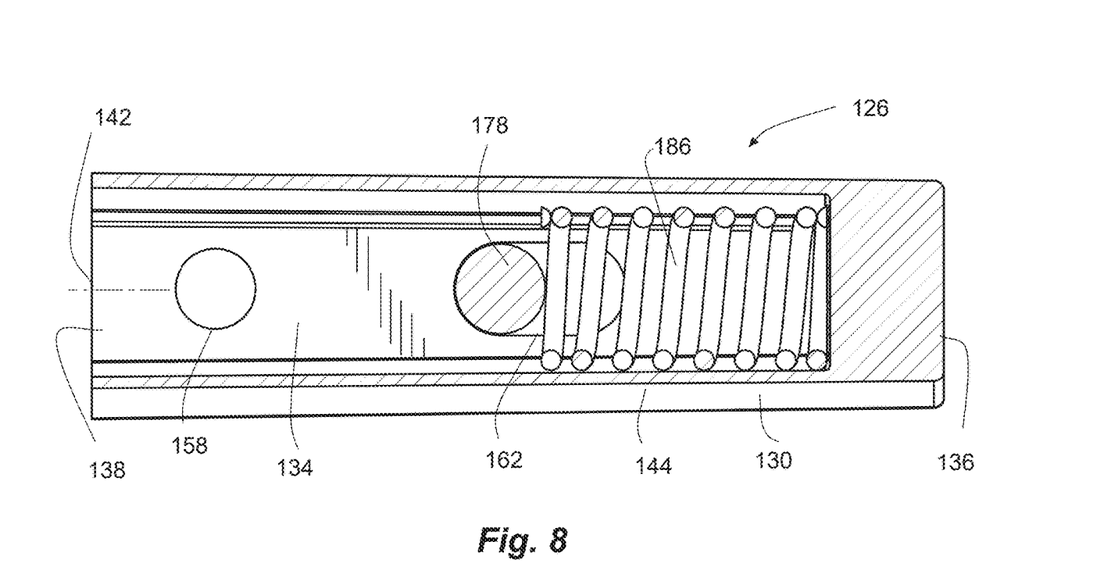
FIG. 8 is a cross-sectional side view of the cartridge of the tripod stand of FIG. 1a, taken along line 8 of FIG. 4.
Figure 9:
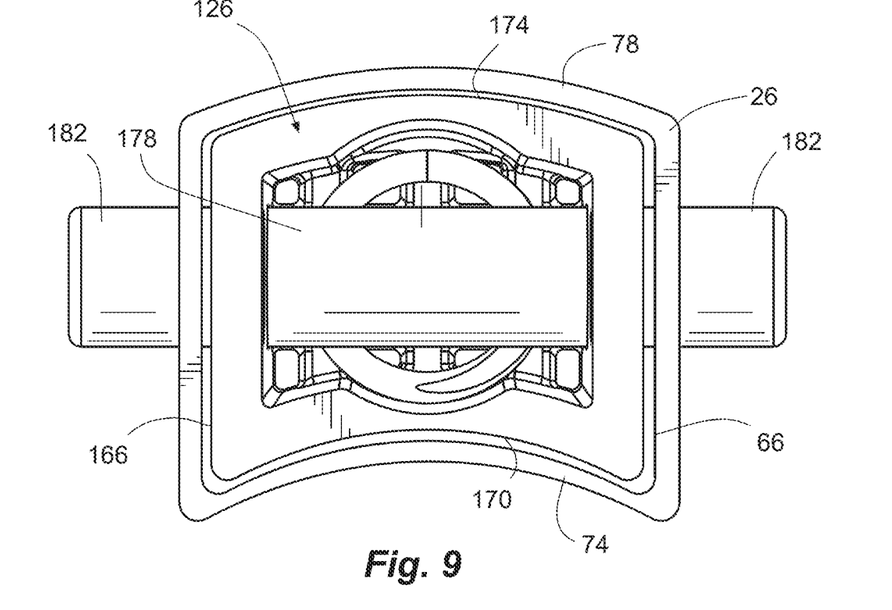
Figure 10:
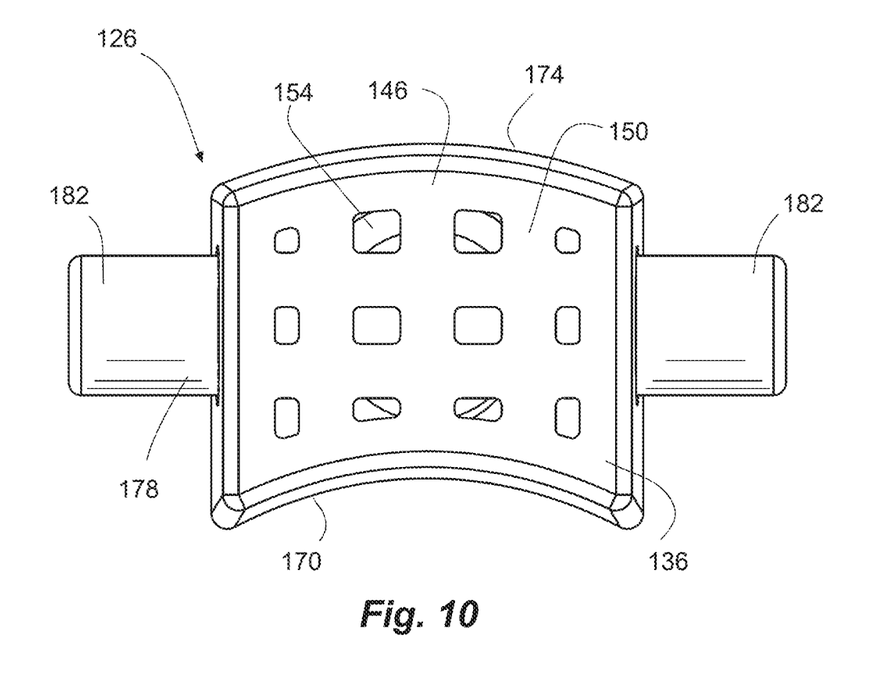
Figure 11:
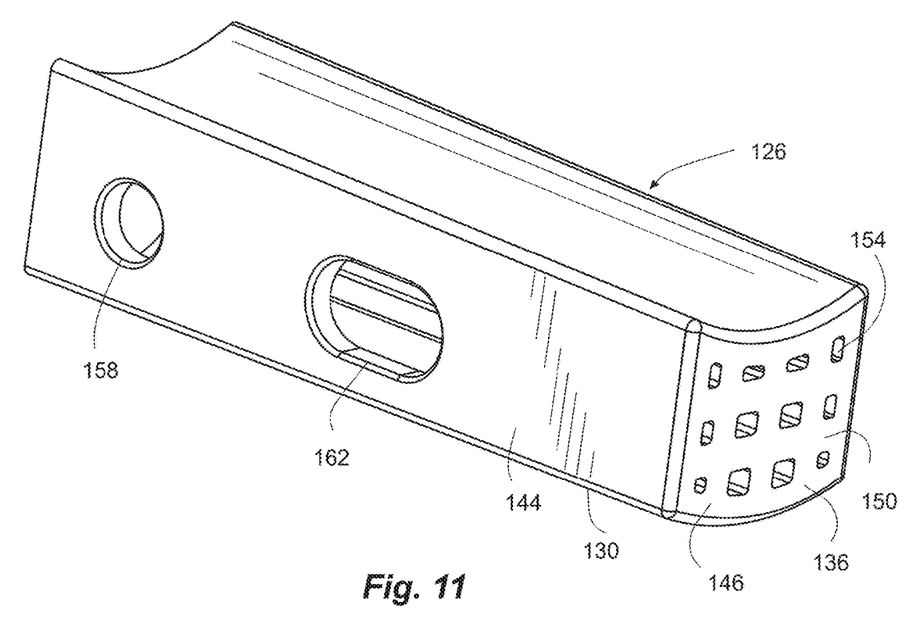
Figure 12:
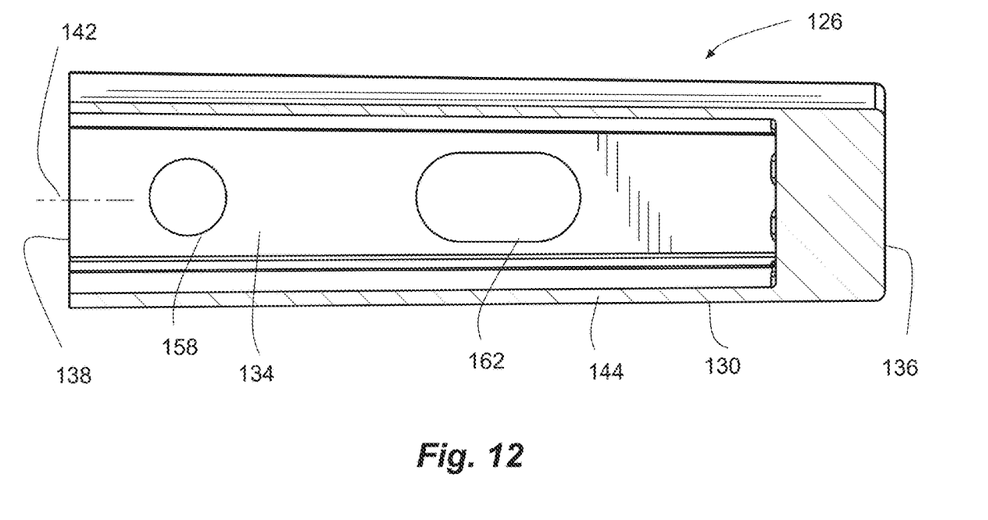
Figure 13:
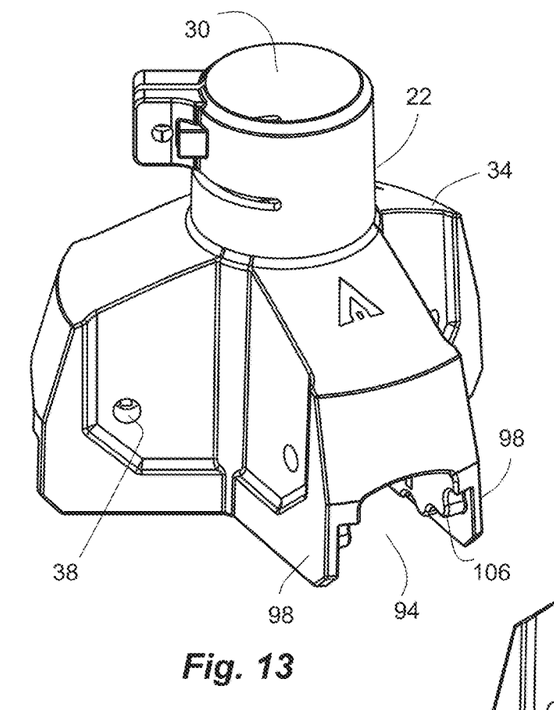
Figure 14:
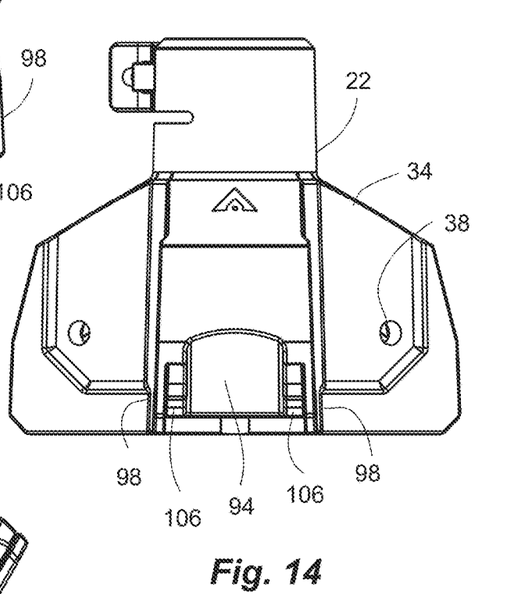
Figure 15:
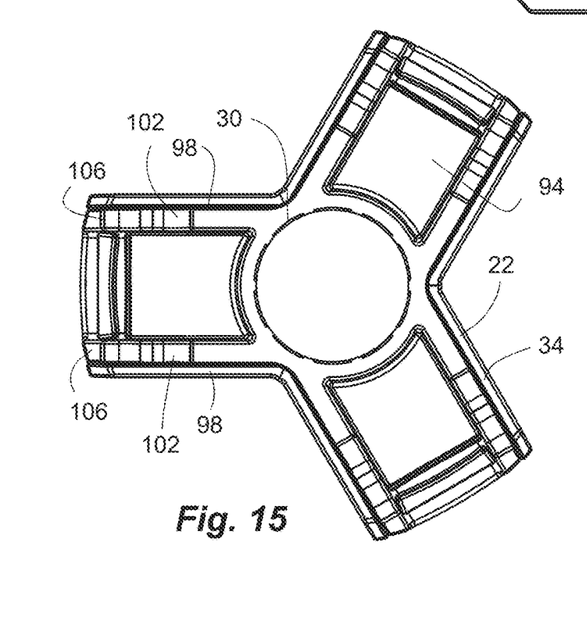
Figures 16, 17:
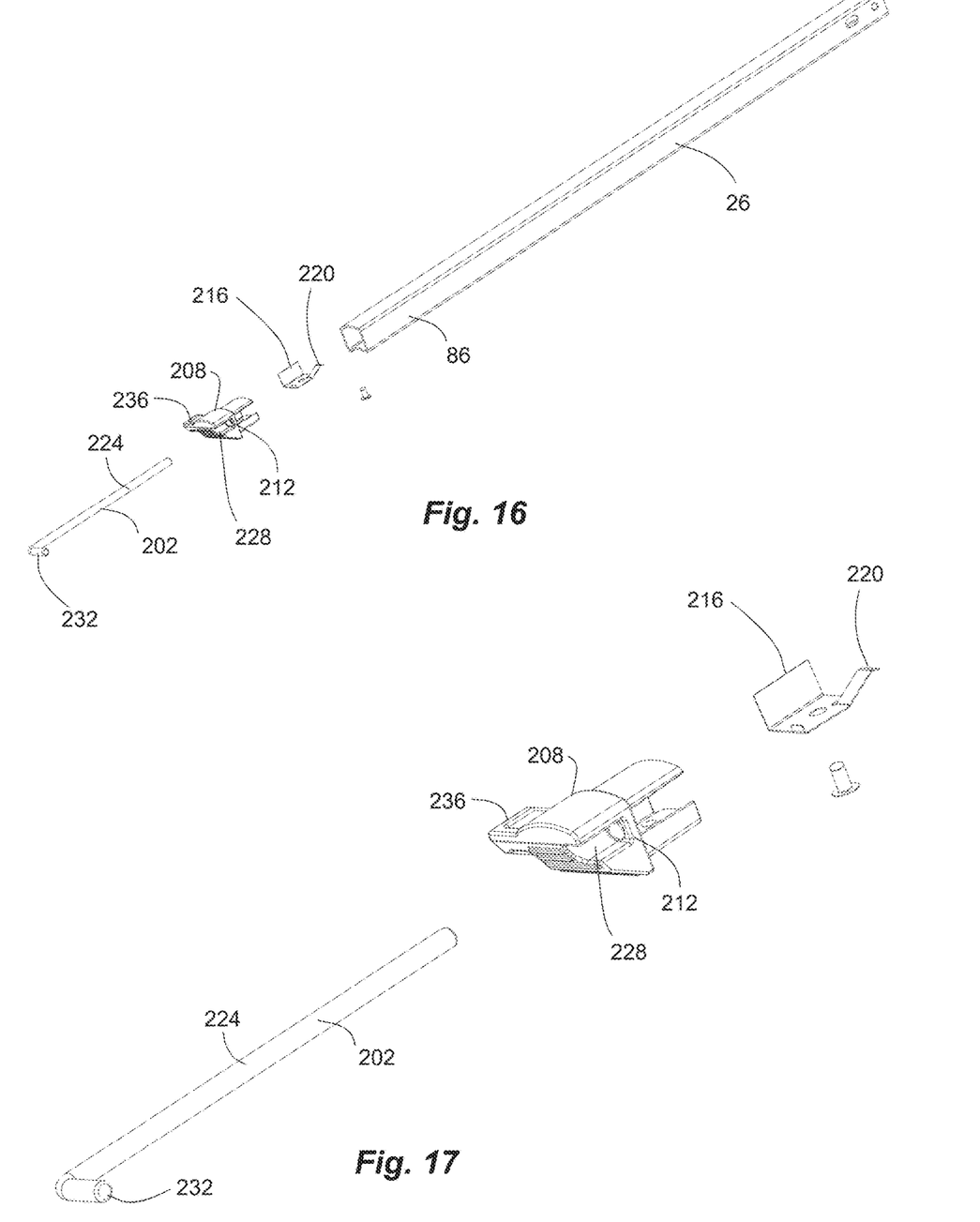
Figures 18, 19:
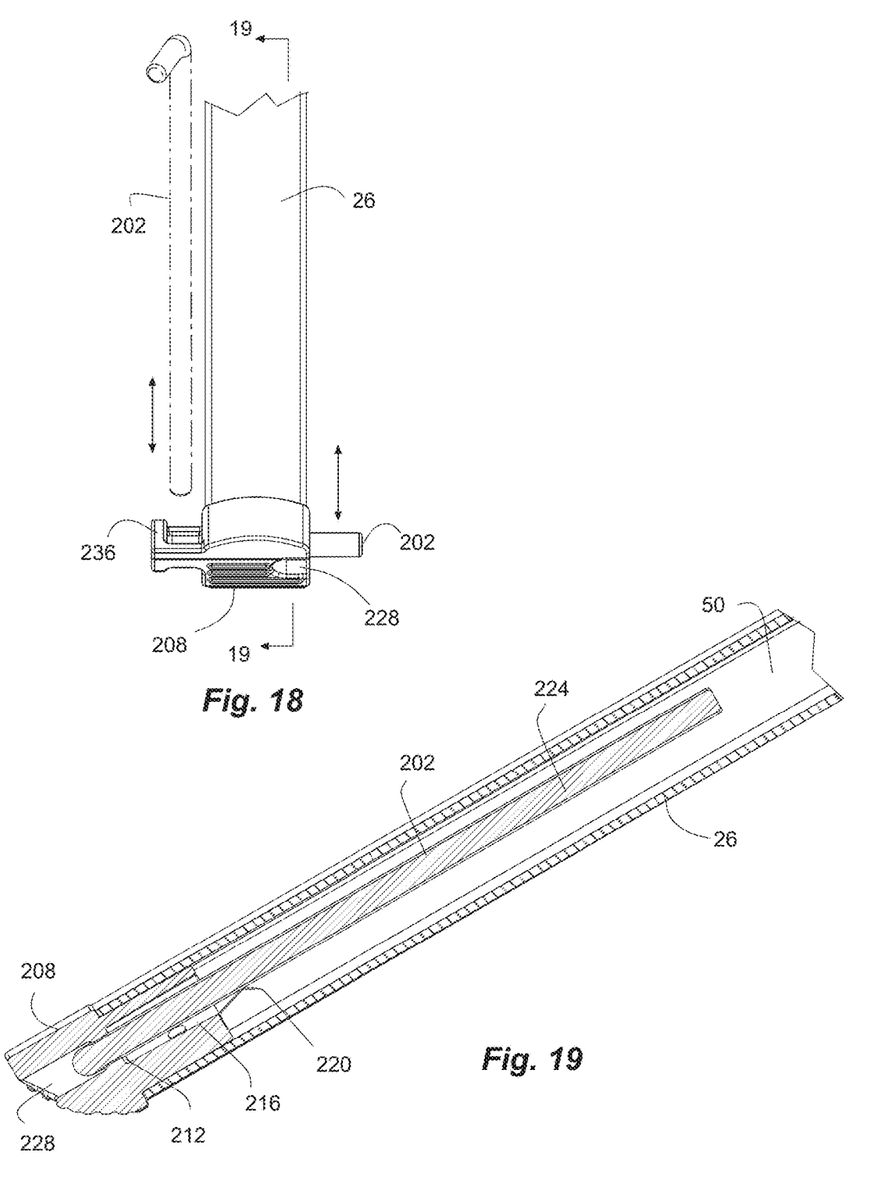
FIG. 18 is a partial front view of the leg of the tripod stand of FIG. 1a, shown with a spike.
FIG. 19 is a partial cross-sectional side view of the leg of the tripod stand of FIG. 1a, taken along line 19 of FIG. 18.
Figure 20:
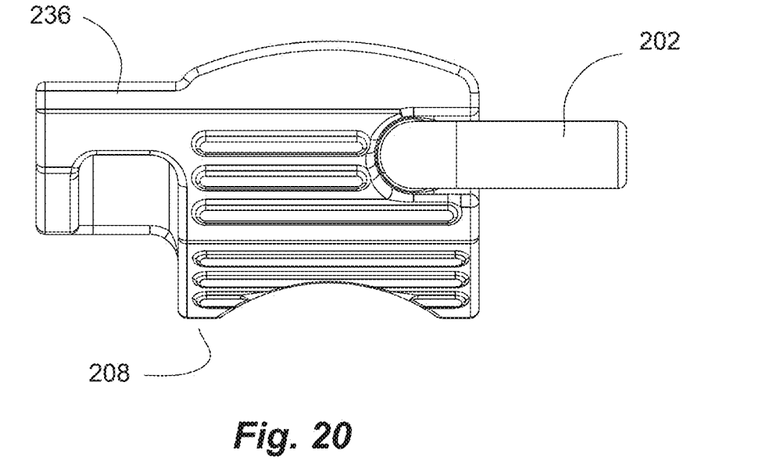
Figure 21:
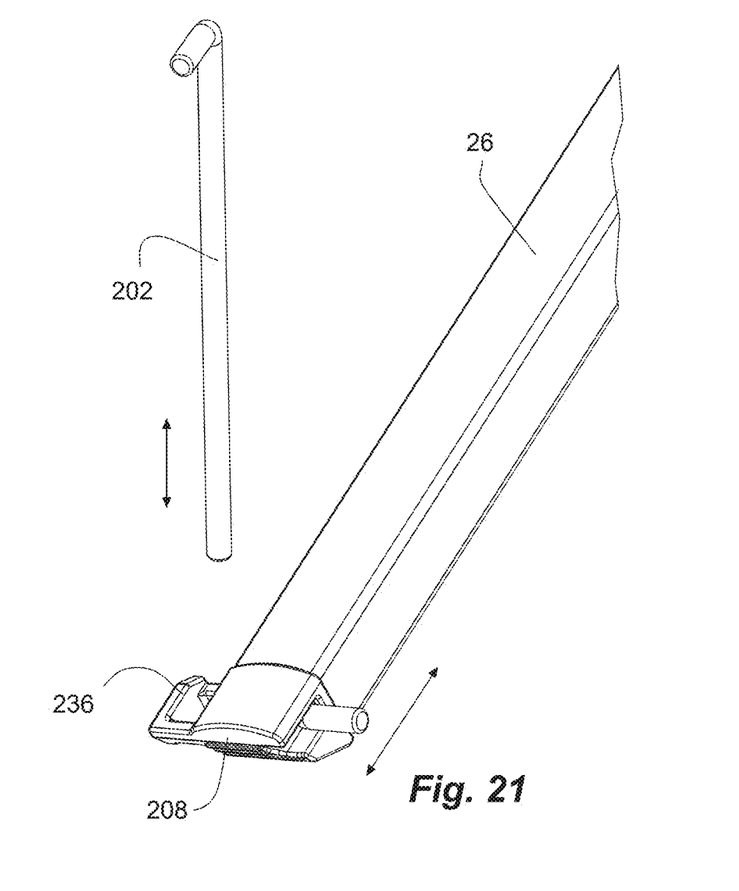
FIG. 21 is a partial perspective view of the leg of the tripod stand of FIG. 1a, shown with the spike.

In another aspect, referring to FIG. 6, a first valley 190 of the wavy profile 114, associated with the collapsed orientation, can have a first distance r1 between the pivot axle 46 and the first valley 190. Similarly, a second valley 194 of the wavy profile 114, associated with the extended orientation, can have a second distance r2 between the pivot axle 46 and the second valley 194. The first distance r1 can be less than the second distance r2, i.e. R2>r1. Similarly, a third valley 198 of the wavy profile 114, associated with the intermediate orientation, can have a third distance r3 between the pivot axle 46 and the third valley 198. The first distance r1 can be less than the third distance r3, i.e. R3>r1. Thus, the spring 186 can be more compressed in the second and third valleys 194 and 198, and less compressed in the first valley 190, so that a greater spring force is maintained in the second and third valleys 194 and 198 corresponding to the extended and intermediate orientations. In addition, the second and third valleys 194 and 198 can be shallower, and the first valley 190 can be deeper, to provide a smoother transition out of the second and third valleys 194 and 198 corresponding to the extended and intermediate orientations.

In use, the leg 26 can be pivoted back-and-forth between the collapsed and extended orientations, and the intermediate orientation. As a lesser initial force is applied to the leg 26, the bar 178 under force of the spring 186 resists movement out of the valley 118. As a greater subsequent force is applied to the leg 26, the bar 178 follows the track 106 out of the valley 118 and along the peak 122, compressing the spring 186. As the bar 178 crests the peak 122, the bar 178 follows the track 106 along the peak 122 and into a proximate valley 118; positioning the leg 26 in a proximate orientation.

The cartridge 126 can provide additional strength to the proximal end 54 of the leg 26 to bear forces applied at the connection 82 due to the forces applied by spring 186 and the bar 178 along the wavy profile 114 of the track 106. In addition, the cartridge 126 can provide bearing surfaces for the movement of the bar 178, and pivoting about the pivot axle 46. In one aspect, the slots 162 in the cartridge 126 can be narrower than the slots 62 of the leg 26 so that the bar 178 can slide along a surface of the cartridge 126, which can be formed of plastic. Similarly, the apertures 158 of the cartridge 126 can be smaller than the bores 58 of the leg 26 so that the fastener 42 and the pivot axle 46 can rotate in the apertures 158 of the cartridge 126, which can be formed of plastic.

Referring to FIGS. 16-21, the tripod stand 10 can further comprise at least one spike 202 removably carried by at least one leg 26 to facilitate securing the tripod stand 10 to the ground for additional stability. Thus, the tripod stand 10 can be staked to further resist tipping, and the spike 202 can be retained by the tripod stand 10 to resist loss and provide easy access.

At least one of the legs 26 can have a foot 208 at the distal free end 86 of the leg 26. The foot 208 can have a protrusion insertable through the open end of the distal free end 86 of the leg 26 and into the hollow 50. A spike bore 212 can extend through the foot 208. The spike bore 212 can be aligned with the longitudinal axis 70 of the leg 26. In one aspect, the foot 208 can be formed of plastic, and can be formed by injection molding.

A clip 216 can be carried by the distal free end 86 of the leg 26 and the foot 208. A fastener, such as a rivet, can secure the clip 216 and the foot 208 to the leg 26. The clip 216 can be positioned proximate the spike bore 212 of the foot 208. The clip 216 or a portion thereof, such as a finger 220, can extend across a profile of the spike bore 212 of the foot 208. The spike 202 can have a shank 224 that engages the clip 216 or the finger 220 thereof to releasable retain the spike. Thus, the clip 216 or the finger 220 can bear against the shank 224 of the spike 202 to resist undesired movement or removal. The shank 224 of the spike 202 can have a friction or interference fit with the spike bore 212 of the foot 208 and/or the clip 216 and the finger 220 to resist undesired movement or removal.

The spike 202 can have at least two positions, including a retained position, and a spike position. In the retained position, the shank 224 of the spike 202 can be inserted through the spike bore 212 of the foot 208 and can be engaged by the clip 216 or the finger 220 thereof to releasable maintain the shank 224. In addition, the foot 208 can have a pocket 228 to receive a head 232 of the spike 202 in the retained position. In the spike position, the spike 202 can be removed from the spike bore 212 of the foot 208 and inserted through a loop 236 of the foot 208 and into the ground to secure the tripod stand 10 to the ground.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility to a numerical range endpoint by providing that a given value may be "a little above" or "a little below" the endpoint. It is understood that express support is intended for exact numerical values in this specification, even when the term "about" is used in connection therewith.

The terms "interference fit" and "friction fit" are terms of art used interchangeably herein to refer to deliberately causing, increasing and/or using friction to deliberately resist movement. An interference fit or friction fit is different than and great than the existence of friction. While friction may exist between any two surfaces, is often desirable to do all one can to reduce this friction. An interference fit or friction fit can be distinguished from naturally occurring friction by being actually deliberately caused and increased. An interference fit can be created by dimensioning engaging parts so that their surfaces tightly bear against one another. A friction fit can be created by surface roughness that is rougher.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A tripod stand configured to support a pole mounted lantern, the tripod stand comprising:
   a) a base with a plurality of legs, each leg pivotally coupled to the base at a connection, the connection comprising:
   b) a pivot axle pivotally coupling the leg to the base, the leg being pivotal about the pivot axle between a plurality of different orientations, including:
      i) a collapsed orientation with a distal free end of the leg positioned inward with respect to the base and proximate distal free ends of the plurality of legs, and with the leg oriented substantially vertically and parallel with a longitudinal axis of the base;
      ii) an extended orientation with the distal free end positioned outward with respect to the base and away from the distal free ends of the plurality of legs, and with the leg oriented transverse with respect to the longitudinal axis of the base; and
      iii) at least one intermediate orientation with the leg oriented between the collapsed orientation and the extended orientation;
   c) a channel in the base to receive the proximal end of the leg, and having:
      i) a pair of opposing side walls;
      ii) a pair of opposing protrusions extending inward towards one another from the pair of opposing side walls;
      iii) a pair of tracks on the pair of opposing protrusions and facing outwardly with respect to the channel;
      iv) each of the pair of tracks being arcuate with a convex curvature about the pivot axle; and
      v) each of the pair of tracks having a wavy profile with a plurality of valleys, each valley being positioned between proximate peaks;
   d) a bar carried by the proximal end of the leg, the bar movably positioned in the channel and oriented perpendicularly to the pair of opposing side walls and parallel with the pivot axle, the bar having opposite ends engaging the pair of tracks; and
   e) a spring carried by the proximal end of the leg and associated with the bar, the spring biasing the bar into engagement with the pair of tracks and into a valley of the wavy profile and resisting displacement of the bar out of the valley of the wavy profile.

2. The tripod stand in accordance with claim 1, further comprising:
a cartridge inserted into a hollow of the proximal end of the leg;
the cartridge carrying the bar and the spring; and
the cartridge having a cavity with a bottom, and with the spring extending between the bottom and the bar.

3. The tripod stand in accordance with claim 2, further comprising:
the cartridge having an open end opposite the bottom.

4. The tripod stand in accordance with claim 2, wherein the bottom of the cartridge has a thickness along a longitudinal axis of the cartridge greater than a thickness of a lateral wall of the cartridge perpendicular to the longitudinal axis of the cartridge.

5. The tripod stand in accordance with claim 2, wherein the bottom of the cartridge has a grid with a plurality of ribs extending across the cavity and traversing one another.

6. The tripod stand in accordance with claim 2, further comprising:
the proximal end of the leg having:
a pair of bores aligned with the pivot axle; and
a pair of opposite slots receiving the bar therethrough;
the cartridge having:
a pair of apertures aligned with the pair of bores of the leg; and
a pair of opposite slots aligned with the pair of opposite slots of the leg; and
the pivot axle extending through the pair of bores of the leg and the pair of apertures of the cartridge.

7. The tripod stand in accordance with claim 2, wherein the cartridge has a cross-sectional exterior perimeter taken perpendicularly to a longitudinal axis of the cartridge that matches a cross-sectional profile of an interior perimeter of a hollow of the leg taken perpendicularly to a longitudinal axis of the leg.

8. The tripod stand in accordance with claim 2, wherein the cartridge has opposite sides with one side being concave and another side being convex.

9. The tripod stand in accordance with claim 1, wherein the plurality of valleys and the peaks having oppositely oriented crescent profiles arranged in series.

10. The tripod stand in accordance with claim 1, further comprising:
a first distance between the pivot axle and a first valley of the wavy profile associated with the collapsed orientation is less than a second distance between the pivot axle and a second valley of the wavy profile associated with the extended orientation.

11. The tripod stand in accordance with claim 1, further comprising:
a first valley of the wavy profile associated with the collapsed orientation is deeper than a second valley of the wavy profile associated with the extended orientation.

12. The tripod stand in accordance with claim 1, wherein at least one of the legs further comprises:
a foot at the distal free end of the leg;
a bore through the foot;
a clip carried by the distal free end of the leg proximate the bore of the foot; and
a spike removably carried by the distal free end of the leg and having at least two positions, including:
a retained position with a shank of the spike inserted through the bore of the foot and engaged by the clip to releasable maintain the shank; and
a spike position with the spike removed from the bore of the foot and inserted through a loop of the foot.

13. The tripod stand in accordance with claim 1, further in combination with the pole mounted lantern, further comprising:
a pole extending vertically from the base; and
the pole mounted lantern carried by the pole.

14. A tripod stand configured to support a pole mounted lantern, the tripod stand comprising:
a) a base with a plurality of legs, each leg having a proximal end pivotally coupled to the base at a connection, the connection comprising:
b) a pivot axle pivotally coupling the leg to the base, the leg being pivotal about the pivot axle between a plurality of different orientations, including:
i) a collapsed orientation with a distal free end of the leg positioned inward with respect to the base and proximate distal free ends of the plurality of legs, and with the leg oriented substantially vertically and parallel with a longitudinal axis of the base;
ii) an extended orientation with the distal free end positioned outward with respect to the base and away from the distal free ends of the plurality of legs, and with the leg oriented transverse with respect to the longitudinal axis of the base; and
iii) at least one intermediate orientation with the leg oriented between the collapsed orientation and the extended orientation;
c) a channel in the base to receive the proximal end of the leg, and having:
i) a pair of opposing side walls;
ii) a pair of opposing protrusions extending inward towards one another from the pair of opposing side walls;
iii) a pair of tracks on the pair of opposing protrusions and facing outwardly with respect to the channel;
iv) each of the pair of tracks being arcuate with a convex curvature about the pivot axle; and
v) each of the pair of tracks having a wavy profile with a plurality of valleys, each valley being positioned between proximate peaks;
d) the leg comprising:
a pair of bores aligned with the pivot axle; and
a pair of opposite slots;
e) a cartridge inserted into a hollow of the proximal end of the leg, the cartridge comprising:
a pair of apertures aligned with the pair of bores of the leg; and
a pair of opposite slots aligned with the pair of opposite slots of the leg;
f) a bar carried by the cartridge and the proximal end of the leg, the bar movably positioned in the channel of the base and oriented perpendicularly to the pair of opposing side walls and parallel with the pivot axle, the bar having opposite ends extending through the pair of opposite slots of the cartridge and the pair of opposite slots of the leg and into engagement with the pair of tracks in the channel of the base; and
g) a spring carried by the cartridge and the proximal end of the leg and associated with the bar, the spring biasing the bar into engagement with the pair of tracks and into a valley of the wavy profile and resisting displacement of the bar out of the valley of the wavy profile.

15. The tripod stand in accordance with claim 14, further comprising:
the cartridge having a cavity with a bottom, and with the spring extending between the bottom and the bar.

16. The tripod stand in accordance with claim 15, wherein the bottom of the cartridge has thickness along a longitudinal axis of the cartridge greater than a thickness of a lateral wall of the cartridge perpendicular to the longitudinal axis of the cartridge.

17. The tripod stand in accordance with claim 15, wherein the bottom of the cartridge has a grid with a plurality of ribs extending across the cavity and traversing one another.

18. The tripod stand in accordance with claim 14, wherein the cartridge has a cross-sectional exterior perimeter taken perpendicularly to a longitudinal axis of the cartridge that matches a cross-sectional profile of an interior perimeter of a hollow of the leg taken perpendicularly to a longitudinal axis of the leg.

19. The tripod stand in accordance with claim 14, wherein at least one of the legs further comprises:
a foot at the distal free end of the leg;
a bore through the foot;
a clip carried by the distal free end of the leg proximate the bore of the foot; and
a spike removably carried by the distal free end of the leg and having at least two positions, including:
a retained position with a shank of the spike inserted through the bore of the foot and engaged by the clip to releasable maintain the shank; and
a spike position with the spike removed from the bore of the foot and inserted through a loop of the foot.

20. A tripod stand configured to support a pole mounted lantern, the tripod stand comprising:
a) a base with a plurality of legs, each leg having a proximal end pivotally coupled to the base at a connection, the connection comprising:
b) a pivot axle pivotally coupling the leg to the base, the leg being pivotal about the pivot axle between a plurality of different orientations, including:
i) a collapsed orientation with a distal free end of the leg positioned inward with respect to the base and proximate distal free ends of the plurality of legs, and with the leg oriented substantially vertically and parallel with a longitudinal axis of the base;
ii) an extended orientation with the distal free end positioned outward with respect to the base and away from the distal free ends of the plurality of legs, and with the leg oriented transverse with respect to the longitudinal axis of the base; and
iii) at least one intermediate orientation with the leg oriented between the collapsed orientation and the extended orientation;
c) a channel in the base to receive the proximal end of the leg, and having:
i) a pair of opposing side walls;
ii) a pair of opposing protrusions extending inward towards one another from the pair of opposing side walls;
iii) a pair of tracks on the pair of opposing protrusions and facing outwardly with respect to the channel;
iv) each of the pair of tracks being arcuate with a convex curvature about the pivot axle; and
v) each of the pair of tracks having a wavy profile with a plurality of valleys, each valley being positioned between proximate peaks;
d) the leg comprising:
a pair of bores aligned with the pivot axle; and
a pair of opposite slots;
e) a cartridge inserted into a hollow of the proximal end of the leg, the cartridge comprising:
a cavity with a bottom;
the bottom has a thickness along a longitudinal axis of the cartridge greater than a thickness of a lateral wall of the cartridge perpendicular to the longitudinal axis of the cartridge;
the bottom has a grid with a plurality of ribs extending across the cavity and traversing one another;
an open end opposite the bottom;
a pair of apertures aligned with the pair of bores of the leg; and
a pair of opposite slots aligned with the pair of opposite slots of the leg;
f) a bar carried by the cartridge and the proximal end of the leg, the bar movably positioned in the channel of the base and oriented perpendicularly to the pair of opposing side walls and parallel with the pivot axle, the bar having opposite ends extending through the pair of opposite slots of the cartridge and the pair of opposite slots of the leg and into engagement with the pair of tracks in the channel of the base; and
g) a spring carried by the cartridge and the proximal end of the leg and extending between the bottom of the cavity of the cartridge and the bar, the spring biasing the bar into engagement with the pair of tracks and into a valley of the wavy profile and resisting displacement of the bar out of the valley of the wavy profile.

* * * * *